United States Patent
Burdgick

(10) Patent No.: US 6,648,332 B1
(45) Date of Patent: Nov. 18, 2003

(54) STEAM TURBINE PACKING CASING HORIZONTAL JOINT SEALS AND METHODS OF FORMING THE SEALS

(75) Inventor: Steven Sebastian Burdgick, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/206,827

(22) Filed: Jul. 29, 2002

(51) Int. Cl.[7] .................... F16J 15/447; F16J 15/44; F01D 25/26; F01D 11/02
(52) U.S. Cl. .................... 277/303; 277/411; 277/412; 277/416; 415/135; 415/138; 415/174.5; 415/230
(58) Field of Search ................... 277/409, 411, 277/412, 413, 416, 421, 643, 654, 303; 415/135, 138, 139, 174.5, 230

(56) References Cited

U.S. PATENT DOCUMENTS

| | | | | |
|---|---|---|---|---|
| 957,887 A | * | 5/1910 | Junggren | 277/421 |
| 2,229,963 A | * | 1/1941 | Dickinson | 277/421 |
| 4,537,024 A | * | 8/1985 | Grosjean | 60/791 |
| 5,002,288 A | * | 3/1991 | Morrison et al. | 277/413 |
| 5,624,227 A | | 4/1997 | Farrell | |
| 5,833,244 A | * | 11/1998 | Salt et al. | 277/421 |
| 5,934,687 A | | 8/1999 | Bagepalli et al. | |
| 5,971,400 A | * | 10/1999 | Turnquist et al. | 277/416 |
| 6,079,944 A | * | 6/2000 | Tomita et al. | 415/139 |

\* cited by examiner

*Primary Examiner*—Anthony Knight
*Assistant Examiner*—Vishal Patel
(74) *Attorney, Agent, or Firm*—Nixon & Vanderhye

(57) ABSTRACT

Spline seals are formed at the joints between packing casing shells in a steam turbine having high pressure and intermediate pressure turbine sections sealing between the high pressure and intermediate pressure regions on opposite axial sides of the packing casing. The spline seals extend in registering grooves from adjacent the seal segments of the rotor radially outwardly to adjacent axial load surfaces cooperable between the outer shell and the packing casing. The spline seals minimize or eliminate steam leakage paths through the horizontal joint of the packing casing shells.

14 Claims, 3 Drawing Sheets

STEAM TURBINE PACKING CASING HORIZONTAL JOINT SEALS AND METHODS OF FORMING THE SEALS

BACKGROUND OF THE INVENTION

The present invention generally relates to seals for steam turbines and particularly to packing casing seals at the horizontal midline joint for sealing between high and intermediate pressure regions of high and intermediate pressure turbine sections and methods of forming the seals.

Steam turbines are oftentimes comprised of axially spaced high and intermediate pressure turbine sections about a rotor common to each section. As well known, each section includes a plurality of circumferentially spaced buckets mounted on the rotor at axially spaced positions forming with nozzle assemblies attached to an outer shell, a plurality of turbine stages. Between the high pressure and intermediate pressure sections of the steam turbine, there is a packing casing. The packing casing is formed typically of a plurality of shells, i.e., conventionally two half-shells, joined to one another along a horizontal midline. The packing casing includes a plurality of axially spaced arcuately extending grooves for receiving packing seal segments mounting labyrinth teeth for sealing about the rotor. The packing casing extends from the rotor seals generally radially outwardly to a connection with the outer shell of the turbine. The packing casing therefore lies intermediate the steam inlets for the high and intermediate pressure turbine sections. Because the packing casing separates the high pressure inlet flow and the intermediate pressure inlet flow, there is substantial potential for significant leakages of steam across the joint between the shells of the packing casing. Particularly, while the shells are bolted together, thermal variation through the shell during turbine operation, machining tolerances and pressure distortion afford potential for formation of leakage paths through the horizontal joint between the high and intermediate pressure regions. While spring-loaded keys have previously been used in the horizontal joint, those keys do not perform a substantial sealing function. It will be appreciated that significant steam leakage flows past the horizontal joint causes lower machine efficiency and performance.

BRIEF DESCRIPTION OF THE INVENTION

In accordance with a preferred embodiment of the present invention, there is provided a spline seal at the joint interface between the packing casing shells to minimize or eliminate steam leakage paths between the high pressure and intermediate pressure regions of a steam turbine having high pressure and intermediate pressure sections. In each of the endfaces at the joint between adjacent packing casing shells, there is provided a groove opening in a circumferential direction and in registration with a corresponding groove in the adjacent endface. A spline seal is disposed in the registering grooves. The grooves and, hence, the spline seals extend from a location adjacent the rotor to a location adjacent the connection between the packing casing and the outer shell.

More particularly, the connection between the packing casing and the outer shell includes axially butting axial load surfaces whereby the axial load surface on the outer shell serves as a stop, preventing axial movement of the packing casing toward the intermediate pressure section. Additionally, the packing seal segments carried by the packing casing also have cooperating axial load surfaces serving as seals. The groove and spline seals extend from their radially innermost ends adjacent the cooperable axial load surfaces of the packing casing and packing seal segments to adjacent the engaging axial load surfaces between the outer shell and the packing casing. It will be appreciated that the spline seals in the horizontal joint of the packing casing can be applied to original equipment manufactures, as well as retrofitted to existing steam turbine units to increase total machine efficiency.

In a preferred embodiment according to the present invention, there is provided a steam turbine comprising axially spaced turbine sections about a common rotor operable at different pressures, an outer shell about the differential pressure sections and the rotor, a packing casing intermediate the differential pressure sections and connected to the shell, the packing casing separating differential pressure regions on axially opposite sides of the packing casing, the packing casing being formed of at least a pair of arcuate shells having circumferentially registering endfaces joined one to the other forming at least one joint therebetween and between the shell and the rotor, registering grooves in the joint endfaces and a spline seal extending in the registering grooves and sealing between the differential pressure regions on opposite axial sides of the packing casing at the joint.

In a further preferred embodiment according to the present invention, there is provided a steam turbine comprising axially spaced high and intermediate pressure turbine sections about a common rotor, an outer shell about the high and intermediate pressure sections and the rotor, a packing casing intermediate the high and intermediate pressure sections separating high and intermediate pressure regions on axially opposite sides of the packing casing, the packing casing having an axial load surface bearing against an axial load surface carried by the shell for precluding axial movement of the packing casing relative to the shell in response to the pressure differential between the high and intermediate pressure regions, the packing casing being formed of a pair of arcuate shells having circumferentially registering endfaces joined to one another forming a pair of joints therebetween and extending between the shell and the rotor substantially adjacent a horizontal midline of the turbine, registering grooves in each of the endfaces of the packing casing at each joint thereof and spline seals in the registering grooves in each joint sealing between the high and intermediate pressure regions and extending in a generally radial direction from adjacent the rotor to adjacent the axial load surfaces of the packing casing and the shell.

In a further preferred embodiment according to the present invention, there is provided in a steam turbine having axially spaced high and intermediate pressure sections about a common rotor, an outer shell about the high and intermediate pressure sections and the rotor, a packing casing intermediate the high and intermediate pressure sections and separating high and intermediate pressure regions on axially opposite sides of the packing casing, the packing casing being formed of a pair of arcuate shells having circumferentially registering endfaces joined to one another forming a pair of joints therebetween and extending between the rotor and the outer shell substantially adjacent a horizontal midline of the turbine, a method of sealing between the high and intermediate pressure regions on opposite sides of the packing casing, comprising the steps of forming a groove in each endface of the packing casing shells for registration with the groove formed in the opposed endface, inserting a spline seal into the grooves of a pair of endfaces and securing the packing casing shells to one another along the horizontal midline with the spline seals in the registering grooves of the joints.

DETAILED DESCRIPTION OF THE INVENTION

Figure 1:
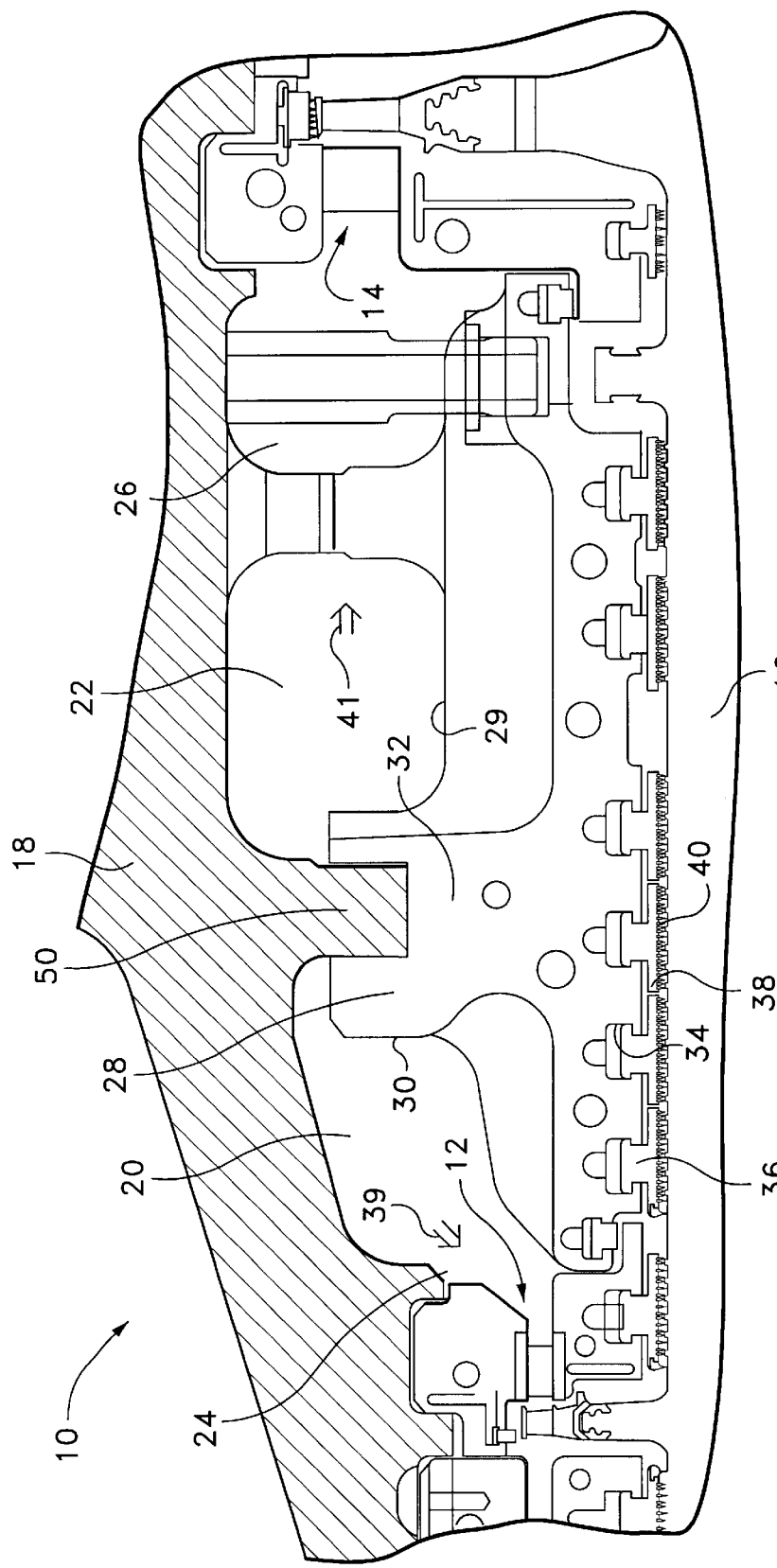
FIG. 1 is a fragmentary cross-sectional view along a plane through an axis and along a horizontal midline of a steam turbine illustrating high and intermediate pressure sections of the turbine according to the prior art.

Referring to the drawings, particularly to FIG. 1, there is illustrated a portion of a prior art steam turbine, generally designated 10, and in this example, comprised of a high pressure turbine section, generally designated 12, and an intermediate turbine section, generally designated 14, i.e., differential pressure sections, mounted about a single integral rotor 16. It will be appreciated that the rotor 16 is driven in rotation by the high and intermediate pressure turbine sections 12 and 14, while the casing or outer shell 18 remains stationary. A steam inlet 20 provides steam under high pressure to the high pressure turbine section 12. A steam inlet 22 provides steam under a lower, e.g., an intermediate pressure to the intermediate pressure turbine section 14. Between high and intermediate pressure regions 24 and 26, supplied with high and intermediate pressure steam via inlets 20 and 22, respectively, there is provided a packing casing 28.

Packing casing 28 is formed preferably of at least a pair of arcuate shells, one of which is illustrated at 29, having diametrically opposite flanges forming endfaces registering and for connection with one an other. One such flange 30 is illustrated in FIG. 1 having an endface 32 for registration with the circumferentially registering end face o f the adjoining arcuate shell. When the packing casing shells are secured to one another with the endfaces in abutting relation, it will be appreciated that the packing casing 28 forms an annulus about the rotor 16 and is supported by and secured to the rotor shell 18.

Figure 2:
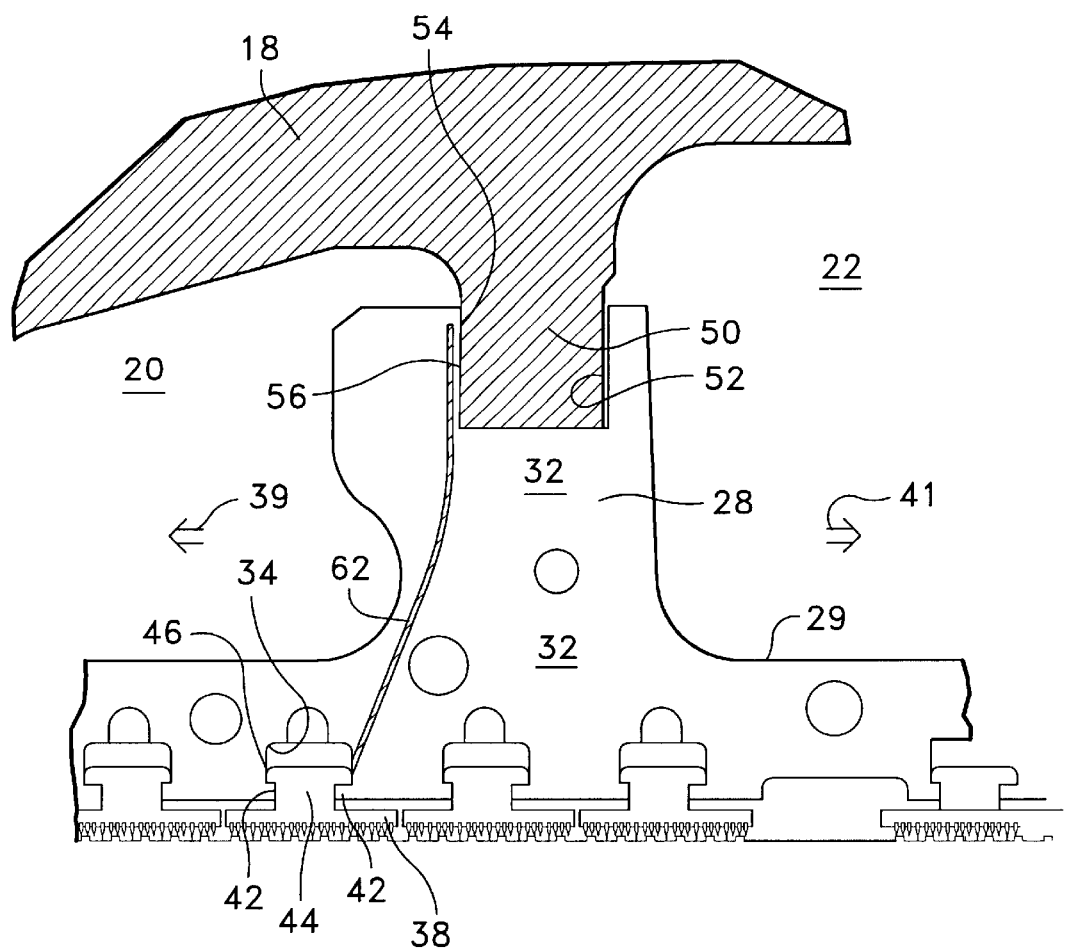
FIG. 2 is an enlarged fragmentary cross-sectional view, particularly illustrating a seal at a joint interface between packing casing shells in accordance with a preferred embodiment of the present invention.

As illustrated in FIGS. 1 and 2, packing casing 28 includes a plurality of axially spaced arcuately extending dovetail-shaped grooves 34. Rolled into each groove is a packing seal segment 36 having radial inward flanges 38 mounting labyrinth seal teeth 40 for forming a seal with the rotor 16. The dovetail-shaped grooves 34 have axially opposed flanges 42 and the packing seal segments have a neck portion 44 intermediate hooks 46 and the flange 38. It will be appreciated that the axial face on the upstream side of the neck 44 (FIG. 2) engages the downstream hook 42 of the packing casing forming cooperable axial load surfaces due to the pressure differential across the packing seal segments. (The terms upstream and downstream refer to the direction of steam flows in the respective high and intermediate pressure sections as indicted by the arrows 39 and 41).

The packing casing 28 extends in a generally radial outward direction for connection with the outer shell 18. Particularly, the outer shell 18 includes a radially inwardly directed flange 50 received in a groove or slot 52 formed along an outer surface of the packing casing 28. In final assembly, the flange 50 and groove 52 are substantially annular in configuration. It will be appreciated that the upstream axial face 54 (FIG. 2) of the packing casing 28 forming the groove 52 lies in axial registration with the downstream face 56 of flange 50. These axial surfaces form axial and load surfaces which cooperate to prevent axial movement of the packing casing 28 in an upstream direction, i.e., to the right in FIG. 2 toward the intermediate pressure section, resulting from differential pressure between the high and intermediate pressure regions of the turbine.

At each of the registering endfaces 32 of the shells forming the packing casing 28, there is provided a groove 60 which registers with a corresponding groove in the opposed endface of the adjacent packing casing shell. In a typical packing casing formed of two shell halves, the groove of each endface registers with the opposing groove of the adjacent endface along the horizontal midline joint of the packing casing. A spline seal 62 extends in the registering grooves 60 and thus extends across the interface of the registering endfaces of adjacent packing casing shells. The spline seals 62 are preferably elongated strips of metal, for example, formed to a thickness of 0.010 inches, with the long opposite edges extending in the respective grooves such that the spline seal spans any gap between opposed endfaces 32. As illustrated in FIG. 2, the radially innermost end of the spline seal 62 and grooves 60 extend from adjacent the axial load surfaces between the packing seal segments 36 and the flange 42 of the packing casing to adjacent the radially outward cooperable axial load surfaces 54 and 56. Thus, the spline seal and grooves span radially outwardly across substantially the entirety of the joint and between locations which per se are sealing surfaces.

Figure 3:
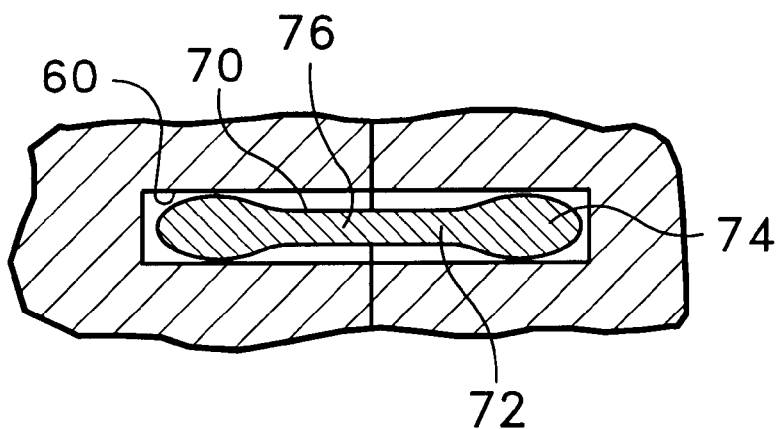
FIG. 3 is a fragmentary cross-sectional view of a form of spline seal.

Referring now to FIG. 3, there is illustrated another form of spline seal for disposition in the grooves 60 of the adjoining packing casing shells. In this form of spline seal 70, there is provided a seal body 72 with enlarged ends, e.g., enlargements 74 along elongated opposite edges of the seal for disposition adjacent the bases of the grooves 60. Thus, the central portion 76 of the seal body 72 has a reduced depth dimension relative to the width of the slots 60 and the enlarged ends 74, accommodating any mismatch between the opposing endfaces 32 of the packing casing shells relative to one another as well as thermal transients during steam turbine operation without damage to the spline seal. The spline seal 70 of FIG. 3 may be of the type disclosed in commonly-owned U.S. Pat. No. 5,624,227, the disclosure of which is incorporated herein by reference.

Figure 4:
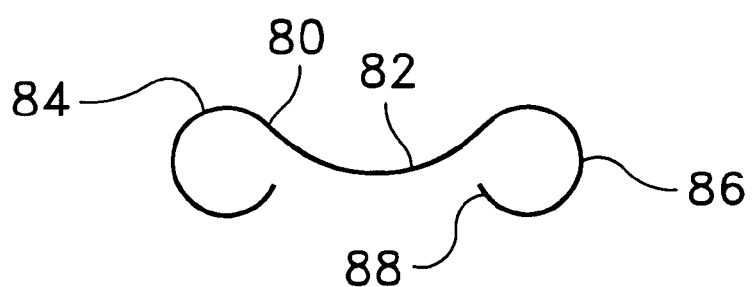
FIG. 4 is a schematic illustration of a further form of spline seal.

Referring now to FIG. 4, another form of spline seal is illustrated. The spline seal 80 of FIG. 4 may be formed of a sheet metal material having a seal body 82 with opposite ends reversely curved or bent at 84 to form enlarged ends, e.g., enlargements 86 along opposite sides of the spline seal 80. Edges 88 of the reversely curved portions face the central portion of the seal body 82. The enlargements 86 are disposed adjacent the bases of the slots 60 and accommodate mismatches of endfaces 32 and enable relative movement of the packing casing shells in the event of thermal transients. This type of spline seal is also disclosed in the above patent.

Figure 5:
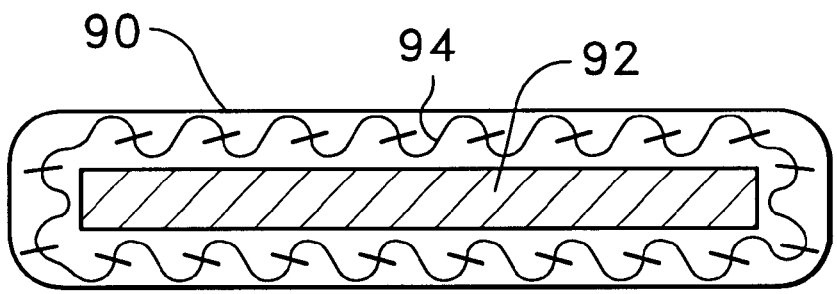
FIG. 5 is an enlarged cross-sectional view of a spline seal illustrating a metallic cloth covering therefor.

Referring to FIG. 5, there is illustrated a further spline seal 90 having a central core 92 formed of metal and having an overlay of cloth material 94. The cloth layer may comprise metal, ceramic and/or polymer fibers which have been woven to form a layer of fabric. The overlying cloth may be of the type disclosed in commonly-owned U.S. Pat. No. 5,934,687, the disclosure of which is incorporated herein by reference.

It will be appreciated from the foregoing that the spline seals are provided in grooves and extend between the opposed endfaces of the packing casing shells to minimize or preclude steam leakage paths between high and intermediate pressure regions on opposite axial sides of the packing casing. Further, it will be appreciated that the seal between the packing casing shells may be formed as part of an original equipment manufacture or retrofitted into existing steam turbines. To accomplish the latter, the steam turbine is torn down, i.e., the upper outer shell is removed and the packing casings are likewise removed. Grooves are then formed in the endfaces of the packing casings so that the grooves in the opposing endfaces register one with the other. With the grooves formed, the packing casing shells can be reassembled and bolted to one another about the rotor. The upper outer shell is then secured to the lower outer shell to complete the retrofit.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A steam turbine comprising:
    axially spaced turbine sections about a common rotor operable at different pressures;
    an outer shell about the differential pressure sections and the rotor;
    a packing casing intermediate said differential pressure sections and connected to said shell, said packing casing separating differential pressure regions on axially opposite sides of the packing casing;
    said packing casing being formed of at least a pair of arcuate shells having circumferentially registering endfaces joined one to the other forming at least one joint therebetween and between said shell and said rotor;
    registering grooves in said joint endfaces; and
    a spline seal extending in said registering grooves and sealing between the differential pressure regions on opposite axial sides of the packing casing at said joint.

2. A turbine according to claim 1 wherein said grooves and said spline seal extend between locations adjacent the rotor and the outer shell.

3. A turbine according to claim 1 wherein one of said packing casing and said outer shell includes a generally circumferentially extending groove having an axial face and another of said packing casing and said outer shell includes a circumferentially extending flange received in said groove forming an axial seal face therebetween, said spline seal and said spline seal grooves extending between locations adjacent the rotor and the axial seal face.

4. A turbine according to claim 3 wherein said packing casing includes a plurality of arcuate axially spaced grooves and arcuate packing seal segments in said grooves for sealing about the rotor, said axially spaced grooves and said packing seal segments having cooperable axial load surfaces, said spline seal and said registering endface grooves of said shells extending from adjacent one of said axial load surfaces and the axial seal face.

5. A turbine according to claim 1 wherein said spline seal and said registering endface grooves extend arcuately in a generally radial direction.

6. A turbine according to claim 1 wherein each said spline seal includes a cloth surrounding said spline seal along opposite sides thereof and about at least a pair of opposite edges thereof.

7. A turbine according to claim 1 wherein each said spline seal comprises a seal body having an enlargement along opposite edges and received in said slots with the enlargements adjacent bases of said slots, respectively.

8. A turbine according to claim 7 wherein said seal body is formed of sheet metal, said enlargements comprising integral bent margins of said sheet metal spline seal having edges facing central portions of said sheet metal spline.

9. A steam turbine comprising:
    axially spaced high and intermediate pressure turbine sections about a common rotor;
    an outer shell about the high and intermediate pressure sections and the rotor;
    a packing casing intermediate said high and intermediate pressure sections separating high and intermediate pressure regions on axially opposite sides of the packing casing, said packing casing having an axial load surface bearing against an axial load surface carried by said shell for precluding axial movement of said packing casing relative to said shell in response to the pressure differential between the high and intermediate pressure regions;
    said packing casing being formed of a pair of arcuate shells having circumferentially registering endfaces joined to one another forming a pair of joints therebetween and extending between said shell and said rotor substantially adjacent a horizontal midline of the turbine;
    registering grooves in each of the endfaces of the packing casing at each joint thereof; and
    spline seals in said registering grooves in each joint sealing between the high and intermediate pressure regions and extending in a generally radial direction from adjacent the rotor to adjacent the axial load surfaces of said packing casing and said shell.

10. A turbine according to claim 9 wherein said packing casing includes a plurality of arcuate axially spaced grooves and arcuate packing seal segments in said grooves for sealing about the rotor, said axially spaced grooves and said packing seal segments having cooperable axial load surfaces, said spline seal and said registering endface grooves of said shells extending from adjacent the cooperable axial load surface of said packing seal segments and said grooves to adjacent the axial load surfaces of said packing casing and said outer shell.

11. A turbine according to claim 9 wherein each said spline seal includes a cloth surrounding said spline seal along opposite sides thereof and about at least a pair of opposite edges thereof.

12. A turbine according to claim 9 wherein each said spline seal comprises a seal body having an enlargement along opposite edges and received in said slots with the enlargements adjacent bases of said slots, respectively.

13. A turbine according to claim 9 wherein said seal body is formed of sheet metal, said enlargements comprising integral bent margins of said sheet metal spline seal having edges facing central portions of said sheet metal spline.

14. In a steam turbine having axially spaced high and intermediate pressure sections about a common rotor, an outer shell about the high and intermediate pressure sections and the rotor, a packing casing intermediate the high and intermediate pressure sections and separating high and intermediate pressure regions on axially opposite sides of the packing casing, said packing casing being formed of a pair of arcuate shells having circumferentially registering endfaces joined to one another forming a pair of joints therebetween and extending between said rotor and said outer shell substantially adjacent a horizontal midline of the turbine, a method of sealing between the high and intermediate pressure regions on opposite sides of the packing casing, comprising the steps of:

forming a groove in each endface of the packing casing shells for registration with the groove formed in the opposed endface;

inserting a spline seal into the grooves of a pair of endfaces; and securing the packing casing shells to one another along the horizontal midline with the spline seals in the registering grooves of the joints.

* * * * *